US009446907B2

(12) United States Patent
Tachibana et al.

(10) Patent No.: US 9,446,907 B2
(45) Date of Patent: Sep. 20, 2016

(54) ZONE CONTROLLER AND CONVEYOR DEVICE

(71) Applicant: Itoh Denki Co., Ltd., Kasai-shi, Hyogo (JP)

(72) Inventors: Toshiyuki Tachibana, Himeji (JP); Shigeki Fukata, Kasai (JP); Toshimasa Enoki, Kasai (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 14/386,180

(22) PCT Filed: Mar. 11, 2013

(86) PCT No.: PCT/JP2013/056692
§ 371 (c)(1),
(2) Date: Sep. 18, 2014

(87) PCT Pub. No.: WO2013/141066
PCT Pub. Date: Sep. 26, 2013

(65) Prior Publication Data
US 2015/0068871 A1    Mar. 12, 2015

(30) Foreign Application Priority Data

Mar. 19, 2012  (JP) .................................. 2012-062182

(51) Int. Cl.
*B65G 13/06*      (2006.01)
*B65G 43/00*      (2006.01)
*B65G 43/10*      (2006.01)
*G05B 19/418*     (2006.01)
*G05B 19/042*     (2006.01)

(52) U.S. Cl.
CPC ............... *B65G 43/00* (2013.01); *B65G 43/10* (2013.01); *G05B 19/042* (2013.01);
(Continued)

(58) Field of Classification Search
CPC ...... B65G 43/00; B65G 43/08; B65G 43/02; B65G 43/10
USPC ........... 198/781.05, 781.06, 460.1, 571, 572; 700/230
See application file for complete search history.

(56) References Cited

U.S. PATENT DOCUMENTS 6,827,202 B2 * 12/2004 Topmiller ............ B65G 47/261
 197/781.05
8,042,681 B2 * 10/2011 Chuang .................. B65G 43/10
 198/781.05

(Continued)

FOREIGN PATENT DOCUMENTS

AU        634261 B2    2/1993
EP        2159655 A2   3/2010

(Continued)

OTHER PUBLICATIONS

International Preliminary Report on Patentability and Written Opinion, PCT/JP2013/056692, Sep. 23, 2014.

(Continued)

*Primary Examiner* — James R Bidwell
(74) *Attorney, Agent, or Firm* — Wood, Phillips, Katz, Clark & Mortimer (57) ABSTRACT

An object of the invention is to provide a zone controller and a conveyor device which facilitate identification of a defective part when a defect occurs in a distributed control type conveyor device. There is provided a zone controller (10) which is used for a conveyor device (1) in which a plurality of zone conveyors (2) are arranged in series, which manages one or a plurality of the zone conveyors (2) to control an operation thereof, and which is configured to receive a signal from a different zone controller (10) and transmit a signal to the outside. The zone controller (10) includes: a signal creation function that creates a predetermined abnormality alarm signal and transmits the created abnormality alarm signal to the outside when an abnormality occurs in a zone managed by the zone controller itself; a signal reception function that receives the abnormality alarm signal from the different zone controller (10); a signal processing function that applies certain processing to the received abnormality alarm signal; and a processed signal transmission function that transmits the signal processed by the signal processing function to the outside as the abnormality alarm signal.

20 Claims, 7 Drawing Sheets

(52) U.S. Cl.
CPC ............. *G05B 19/4185* (2013.01); *G05B 2219/24033* (2013.01); *G05B 2219/33145* (2013.01); *G05B 2219/33226* (2013.01); *G05B 2219/45054* (2013.01); *Y02P 90/10* (2015.11); *Y02P 90/18* (2015.11); *Y02P 90/28* (2015.11)

(56) References Cited

U.S. PATENT DOCUMENTS

| | | |
|---|---|---|
| 2004/0166911 A1 | 8/2004 | Chen |
| 2004/0182684 A1* | 9/2004 | Guidetti ............ B65G 43/08 198/781.06 |
| 2005/0262363 A1 | 11/2005 | Claseman |

FOREIGN PATENT DOCUMENTS

| | | |
|---|---|---|
| JP | 2-81817 A | 3/1990 |
| JP | 2002-356220 A | 12/2002 |
| JP | 2004-26503 A | 1/2004 |
| JP | 2004-307219 A | 11/2004 |
| JP | 2005-119752 A | 5/2005 |
| JP | 2005-231745 A | 9/2005 |

OTHER PUBLICATIONS

Supplementary European Search Report, dated Dec. 1, 2015, in European Patent Appln. No. EP 13 76 4466.

* cited by examiner

ZONE CONTROLLER AND CONVEYOR DEVICE

TECHNICAL FIELD

The present invention relates to a conveyor device of a distributed control type and, more particularly, to a conveyor device which is capable of easily identifying an abnormal part when an abnormality such as a failure occurs, and easily performing communication with a host controller. The present invention also relates to a zone controller used for the distributed control type conveyor device.

BACKGROUND ART

A conveyor device is used in a delivery center of a home delivery company or a post office. As the conveyor device, there are known a roller conveyor device in which cylindrical conveying rollers are arranged along a conveyance line, a belt conveyor device in which a conveying belt is mounted in a stretched state, and the like.

Further, as a control system of the conveyor device, there is known a distributed control system (Patent Document 1). In the distributed control system, a plurality of zone conveyors are arranged in series to form a continuous conveying path. Each zone conveyor is provided with an independent motor. Further, each zone conveyor is provided with a zone controller, and the zone controller manages/controls the corresponding zone conveyor.

The zone controller outputs a motor drive signal and receives a signal from a load presence sensor provided in each zone.

Further, the zone controller is provided with a communication function and exchanges a signal with the adjacent zone controllers.

For example, information indicating an ON/OFF state of the load presence sensor or information indicating whether or not the motor is activated is exchanged between adjacent zone controllers.

For example, when a predetermined condition is satisfied that a conveying object is present in the corresponding zone and a conveying object is not present in a zone on the downstream side, the zone controller activates the motor of the corresponding zone to convey the conveying object to the downstream side zone.

The distributed control type conveyor device has an advantage that a layout can easily be changed. For example, when an overall length of the conveyor device is to be extended, a new zone conveyor is mounted to an end or middle portion of the existing conveyor device. On the other hand, when the overall length of the conveyor device is to be reduced, any of the zone conveyors may be removed, and a generated space may be eliminated.

PRIOR ART DOCUMENT

Patent Document

Patent Document 1: JP 2005-231745 A

SUMMARY OF INVENTION

Technical Problem

The distributed control type conveyor device has drawback in that, when a failure or the like occurs, a failure part cannot be easily identified. Further, it is difficult to identify a defective part in a test run.

That is, the conveyor device is provided with a large number of motors and sensors, which increases a failure occurrence frequency. Further, while the motors or sensors need to be subjected to wiring one by one at installation of the conveyor device, erroneous wiring may occur.

When a failure occurs, or when a desired operation cannot be achieved in a test run, the defective part needs to be identified so as to repair or correct the failure.

However, the distributed control type conveyor device does not originally have a central controller or, even if it has the central controller, the function thereof is restrictive. That is, even if there is the central controller, individual motors or sensors are not directly connected to the central controller, and thus the central controller cannot grasp which component in which zone has the defect.

That is, in the distributed control type conveyor device, power supply to the motor in each zone or input/output of a signal of the sensor in each zone is performed through the zone controller that manages/controls the corresponding zone conveyor. Thus, information indicating whether each component is normal or abnormal is stopped at the zone controller level, with the result that the central controller cannot retrieve the defective part.

The present invention has been made in view of the above conventional problems, and an object thereof is to provide a zone controller and a conveyor device capable of easily identifying a defective part such as a failure part.

Solution to Problem

To solve the above problem, according to a first aspect of the present invention, there is provided a zone controller which is used for a conveyor device in which a plurality of zone conveyors are arranged in series, which manages one or a plurality of the zone conveyors to control an operation thereof, and which is configured to receive a signal from a different zone controller and transmit a signal to an outside, the zone controller including: a signal creation function that creates a predetermined abnormality alarm signal and transmits the created abnormality alarm signal to the outside when an abnormality occurs in a zone managed by the zone controller itself; a signal reception function that receives the abnormality alai in signal from the different zone controller; a signal processing function that applies certain processing to the received abnormality alarm signal; and a processed signal transmission function that transmits the signal processed by the signal processing function to the outside as the abnormality alarm signal.

The zone controller according to the present aspect is used for a conveyor device in which a plurality of zone conveyors are arranged in series, and controls the conveyor device in a distributed manner.

The zone controller according to the present aspect can receive a signal from another zone controller and can transmit a signal to the outside, thereby allowing signal exchange with adjacent zone controllers. For example, information indicating an ON/OFF state of the load presence sensor in the adjacent zones or information indicating whether or not the motor in the adjacent zones is activated is exchanged between adjacent zone controllers, thereby allowing a conveying object to be conveyed to the adjacent zone.

Further, the zone controller according to the present aspect includes the signal creation function, and creates a predetermined abnormality alarm signal and transmits the created abnormality alarm signal to the outside when an abnormality occurs in a zone managed by the zone controller itself.

The abnormality alarm signal is received by an adjacent zone controller. When the abnormality alarm signal is received from another zone controller, certain processing is applied to the received abnormality alarm signal.

Then, the adjacent zone controller transmits the signal processed using the signal processing function to the outside as the abnormality alarm signal. Further, a zone controller adjacently disposed to the adjacent zone controller receives the abnormality alarm signal after processing, and again applies processing to the processed abnormality alarm signal. Thus, the abnormality alarm signal transmitted from such a zone controller is a signal that has been processed twice. In this manner, the abnormality alarm signal sequentially passes through the adjacent zone controllers while being subjected to processing. That is, reception, processing, and transmission of the abnormality alarm signal are performed in the zone controllers in a successive manner.

Finally, the abnormality alarm signal reaches a specific (e.g., endmost) zone controller. Then, the abnormality alarm signal transmitted from this specific (e.g., endmost) zone controller is analyzed to examine a processed state, whereby a zone controller that has first created the abnormality alarm signal can be identified.

That is, in this configuration, the abnormality alarm signal transmitted from a zone controller of a zone in which an abnormality has actually occurred is a signal that has not been subjected to processing at all. The abnormality alarm signal transmitted from the adjacent zone controller is a signal that has been subjected to processing once. The abnormality alarm signal transmitted from the next adjacent zone controller is a signal that has been subjected to processing twice, and the abnormality alarm signal transmitted from the further adjacent zone controller is a signal that has been subjected to processing three times. That is, by going back along a signal transmission path by the number of times of processing, a zone controller of a zone in which an abnormality has actually occurred can be identified.

Preferably, the abnormality alarm signal created by the signal creation function is a pulse signal having a fixed time length, and the signal processing function increases or reduces a pulse width of the pulse signal.

According to the present aspect, there is a correlation between the number of the zone controllers through which the abnormality alarm signal passes along a signal transmission path and a pulse width (time length of the abnormality alarm signal). Thus, by calculating the number of the zone controllers through which the abnormality alarm signal passes along the signal transmission path from the pulse width (time length of the abnormality alarm signal), a zone controller of a zone in which an abnormality has actually occurred can be retrieved.

Preferably, the predetermined signal created by the signal creation function is a pulse signal having a fixed time length, and the signal processing function adds or subtracts a new pulse to or from the pulse signal to increase or reduce the number of pulses.

According to the present aspect, there is a correlation between the number of the zone controllers through which the abnormality alarm signal passes along a signal transmission path and the number of pulses of the abnormality alarm signal. Thus, by calculating the number of the zone controllers through which the abnormality alarm signal passes along the signal transmission path from the number of pulses of the abnormality alarm signal, a zone controller of a zone in which an abnormality has actually occurred can be retrieved.

According to another aspect of the present invention, there is provided a zone controller which is used for a conveyor device in which a plurality of zone conveyors are arranged in series, which manages one or a plurality of the zone conveyors to control an operation thereof, and which is configured to receive a signal from a different zone controller and transmit a signal to an outside, the zone controller including: a signal reception function that receives a pulse signal from the different zone controller; a signal processing function that applies certain processing to the received pulse signal based on a certain function; and a processed signal transmission function that transmits the signal processed by the signal processing function to the outside.

Also in the present aspect, it is possible to receive a pulse signal from the different zone controller, apply certain processing to the received pulse signal based on a certain function, and transmit the processed signal to the outside. This allows identification of a zone controller corresponding to a zone in which the abnormality has occurred.

Further, according to the present aspect, it is possible for the zone controller to transmit to the outside a signal added with information for identifying the zone controller itself. This facilitates exchange of a control signal between a device such as a central controller configured to transmit a control signal to each of the zone controllers constituting the conveyor device and a specific controller of the plurality of zone controllers. This facilitates control with respect to only the specific controller out of the plurality of zone controllers.

Preferably, the zone controller further includes a storage unit that stores the signal processed by the zone controller itself or information related to the processed signal.

According to the present aspect, signal processing or arithmetic processing for the signal processing need not be performed for each signal transmission, thereby further facilitating exchange of the control signal.

Preferably, in the present aspect, the zone controller further includes a signal creation function that creates a predetermined abnormality alarm signal and transmits the created abnormality alarm signal to the outside when an abnormality occurs in a zone managed by the zone controller itself, and the zone controller transmits the abnormality alarm signal and a signal based on the information stored in the storage unit.

In this preferred aspect, a zone controller corresponding to a zone in which an abnormality has occurred may be identified by transmitting the abnormality alarm signal and a signal based on information stored in the storage unit. In this case, it is possible to identify the zone controller without acquiring the number of times of signal processing through calculation or the like.

Preferably, in the present aspect, the zone controller further includes a node number calculation function that determines a node number of the zone controller itself based on the received pulse signal, and information related to the node number created by the node number determination function is stored in the storage unit.

The description "determines a node number of the zone controller itself based on the received pulse signal" herein includes both an operation of determining the node number of the zone controller itself based on the received pulse signal and an operation of determining the node number of the zone controller itself based on a signal created by applying certain processing to the received pulse signal by the signal processing function.

Preferably, the node number calculation function determines the node number of the zone controller itself based on a pulse width or the number of pulses of the received pulse signal.

Preferably, in the present aspect, the zone controller further includes a signal creation function that creates a predetermined abnormality alarm signal and transmits the created abnormality alarm signal to the outside when an abnormality occurs in a zone managed by the zone controller itself. Preferably, the storage unit is configured to store information related to the node number, and the processed signal transmission function outputs both a signal indicating the information related to the node number and the abnormality alarm signal.

Preferably, the zone controller is configured to output a pseudo abnormality alarm signal.

According to still another aspect of the present invention, there is provided a conveyor device in which a plurality of zone conveyors are arranged in series, in which the above-described zone controller is provided for each zone or for each set of a plurality of zones, and in which a signal is exchanged between the adjacent zone controllers, wherein when the zone controller receives the predetermined signal from a zone controller adjacently disposed on one side thereof by the signal reception function, the zone controller transmits a signal processed by the signal processing function, as an abnormality alarm signal, to a zone controller adjacently disposed on the other side thereof.

According to the present aspect, it is possible to identify a zone controller of a zone in which an abnormality has actually occurred.

Preferably, in the present aspect, a pseudo abnormality alarm signal is created and transmitted to the zone controller, the zone controllers that receive the pseudo abnormality signal perform, in a successive manner, a process of applying processing to the signal by the signal processing function and transmitting the processed signal to zone controllers adjacently disposed on the other side thereof by the processed signal transmission function, and each of the zone controllers is configured to store the signal processed by itself or information related to the processed signal.

In the present aspect, each of the zone controllers is allowed to store a position of the zone controller itself on a signal path.

That is, a pseudo abnormality alarm signal is created and transmitted to the zone controller, and the zone controllers that receive the pseudo abnormality signal perform, in a successive manner, a process of applying processing to the signal by the signal processing function and transmitting the processed signal to zone controllers adjacently disposed on the other side thereof by the processed signal transmission function. Then, the zone controllers receive or transmit the abnormality alarm signal different in the number of times of processing. Thus, by storing the information related to such a processed signal or information related to the signal, the number of zone controllers interposed between each of the zone controllers and the zone controller that first receives or transmits the pseudo signal is identified and, thus, the position of the each zone controller is indirectly stored. Therefore, in the conveyor device of the present invention, a relative position of each zone controller is stored therein.

According to yet another aspect of the present invention, there is provided a conveyor device in which a plurality of zone conveyors are arranged in series, in which the above-described zone controller is provided for each zone or for each set of a plurality of zones, and in which a signal is exchanged between the adjacent zone controllers, wherein each of the zone controllers includes a node number calculation function that determines a node number of the zone controller itself based on a pulse width or the number of pulses of a received pulse signal, and a storage unit configured to store the node number, each of the zone controllers configured to execute a node number determination operation of determining the node number based on the received signal, storing the determined node number, processing the signal received by the signal processing function, and transmitting the processed signal to the adjacent zone controller by the processed signal transmission function, and successive execution of the node number determination operation in the zone controllers allows each of the zone controllers to store the node number therein.

Preferably, in the present aspect, each of the zone controllers is configured to determine and store the node number based on a pseudo abnormality alarm signal or a signal obtained by processing the abnormality alarm signal, and the node number determination operation is executed based on one of a pseudo abnormality alarm signal created by at least one zone controller, a pseudo abnormality alarm signal transmitted from an external device, and a signal obtained by processing the pseudo abnormality alarm signal.

Preferably, in the present aspect, in a state where the node number is stored in each of the zone controllers, each of the zone controllers is configured to execute an individual instruction operation of receiving a signal indicating information related to the node number and a command signal, performing an operation specified by the command signal when the received information related to the node number identifies the node number of the zone controller itself, and transmitting, to the adjacent zone controller, the received signal indicating the information related to the node number and the command signal without processing the signals, and successive execution of the individual instruction operation in the zone controllers allows only a predetermined zone controller to perform an operation specified by the command signal.

The operation specified by the command signal includes an operation of changing a motor speed, an operation of changing a conveying speed of the zone controller, an operation of starting, stopping, or suspending a conveying operation of the zone controller, and an operation of rewriting a program of the zone controller.

Preferably, in the present aspect, each of the zone controllers includes a signal creation function that creates a predetermined abnormality alarm signal and transmits the created abnormality alarm signal to the outside when an abnormality occurs in a zone managed by the zone controller itself, and a storage unit that stores the signal processed by the zone controller itself or information related to the processed signal, the storage unit is configured to store information related to the node number, the processed signal transmission function is configured to output both a signal indicating the information related to the node number and the abnormality alarm signal, and each of the zone controllers outputs two signals which are the signal indicating the information related to the node number and the abnormality alarm signal to the adjacent zone controller when an abnormality occurs in a zone managed by the zone controller itself, and the zone controller that receives the two signals from a zone controller adjacently disposed on one side thereof outputs, to a zone controller adjacently disposed on the other side thereof, the two signals without processing the signals.

Preferably, in the present aspect, when the zone controllers execute, in a successive manner, the process of applying processing to the received signal and transmitting the processed signal to the adjacent zone controllers, the signal before the processing and the signal after the processing which are exchanged between the zone controllers have a fixed period but are different in pulse width or the number of pulses.

Effects of Invention

According to the zone controller and conveyor device of the present invention, it is possible to easily find a defective part such as a failure part, allowing a maintenance work and a test run to be smoothly performed.

MODE FOR CARRYING OUT INVENTION

A conveyor device 1 according to an embodiment of the present invention will be described below.

Figure 1:
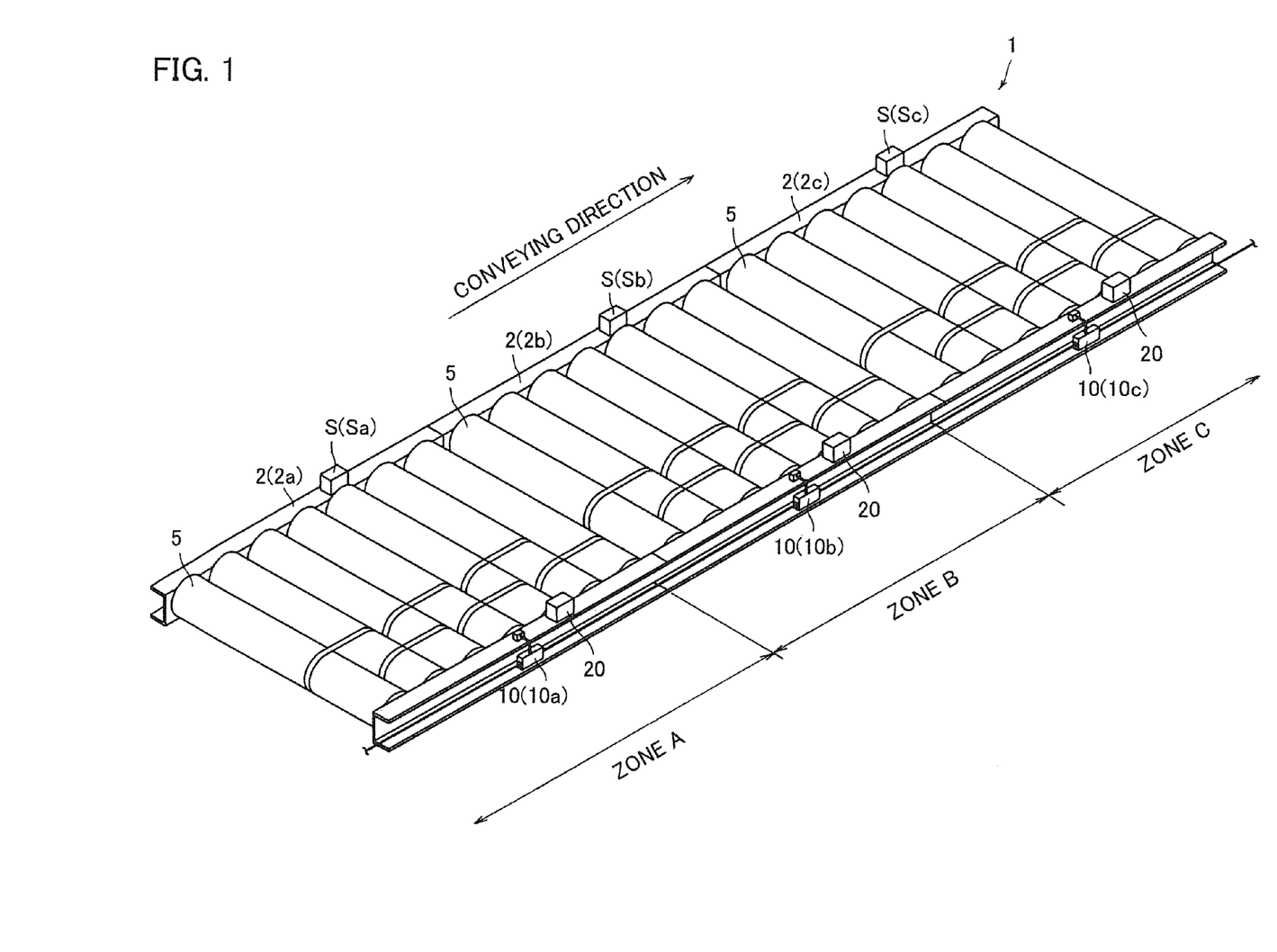
FIG. 1 is a perspective view of a conveyor device according to an embodiment of the present invention.

As illustrated in FIG. 1, the conveyor device 1 includes a plurality of zone conveyors 2 (2a, 2b, 2c, . . . ) arranged in series in a conveying direction. Each zone conveyor 2 (2a, 2b, 2c, . . . ) is a conveying device which mainly includes conveying rollers 5, a load presence sensor S (Sa, Sb, Sc, . . . ) and a zone controller 10 (10a, 10b, 10c, . . . ). Since the zone conveyors 2 (2a, 2b, 2c, 2d . . . ) have the same mechanical configuration and the same size, a structure of the zone conveyor 2b disposed in the center of the figure will be described in detail as a representative example.

Figure 2:
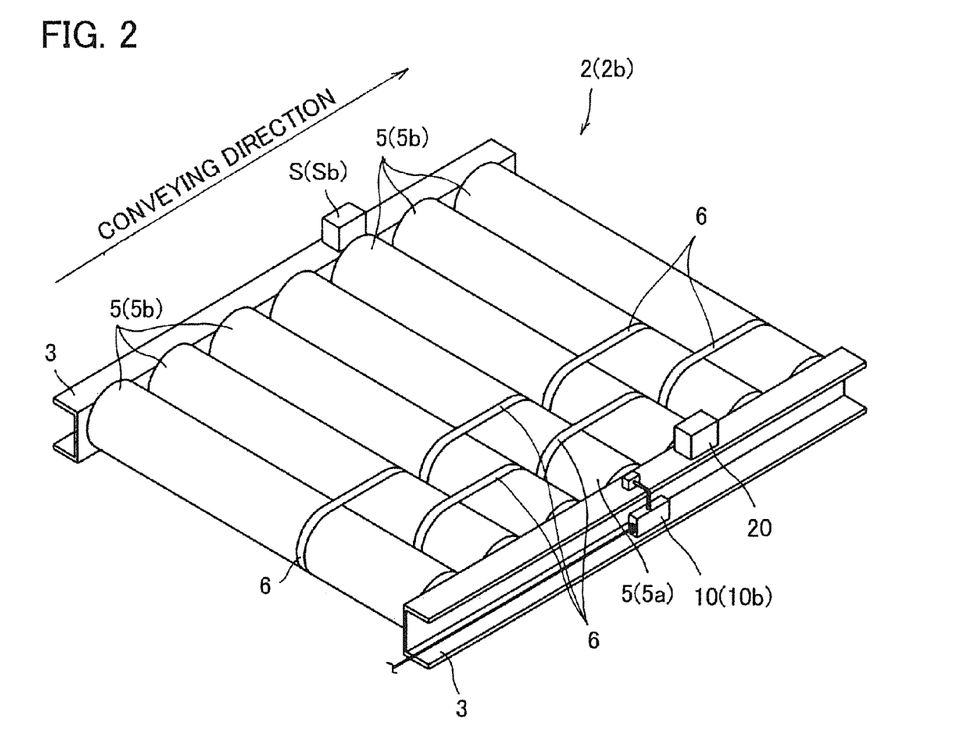
FIG. 2 is a perspective view of a zone conveyor of the conveyor device of FIG. 1.

As illustrated in FIG. 2, the zone conveyor 2b is a device in which a plurality of conveying rollers 5 for conveying a conveying object are axially supported at predetermined interval in the conveying direction between a pair of left and right side frames 3, 3 disposed in parallel. The conveying rollers 5 includes a freely rotatable follower roller 5b and a motor-incorporated roller 5a incorporating a drive motor 4a (not illustrated in FIG. 2; see FIG. 3). In the present embodiment, there is only one motor-incorporated roller 5a, and all the remaining rollers are follower rollers 5b.

A transmission belt 6 is wound around two adjacent conveying rollers 5 in the zone conveyor 2b. Therefore, a rotary drive force of the motor-incorporated roller 5a can be transmitted to all the follower rollers 5b. In the present embodiment, the motor-incorporated roller 5a is disposed in a center portion.

Further, as illustrated in FIG. 2, the load presence sensor Sb is provided in the zone conveyor 2b. The load presence sensor Sb is provided on a side frame 3. The load presence sensor Sb is positioned near a downstream side end.

The load presence sensor Sb is a photoelectric sensor and has a light emitting element 20 such as a light-emitting diode or an infrared diode on an opposing side frame 3. When a conveying object is present, light from the light-emitting element 20 is shielded by the conveying object, causing the load presence sensor Sb to output an ON (High level) signal; whereas when the conveying object is absent, the load presence sensor Sb outputs an OFF (Low level) signal. Thus, turning ON/OF of the photoelectric sensor allows detection of a state where the conveying object has been conveyed to a predetermined position.

Figure 3:
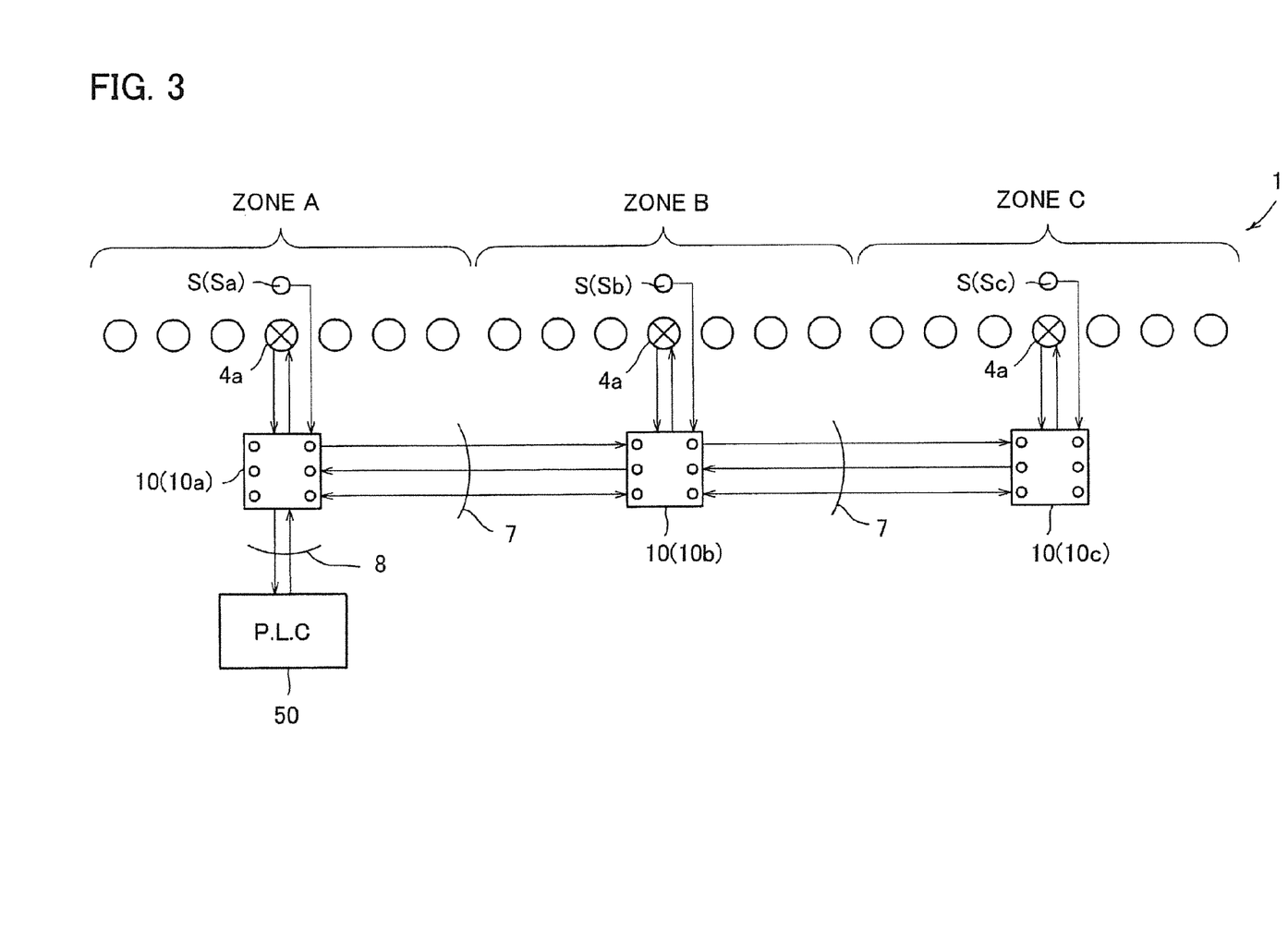
FIG. 3 is a conceptual view illustrating a wiring configuration of the conveyor device of FIG. 1.

As illustrated in FIGS. 2 and 3, the zone controller 10b for controlling drive of the drive motor 4a (see FIG. 3) incorporated in the motor-incorporated roller 5a is mounted to one side frame 3 of the zone conveyor 2b. A known brushless motor is adopted for the drive motor 4a.

As illustrated in FIG. 3, the zone controllers 10 (10a, . . . 10c, . . . 10n) provided in the two adjacent zone conveyors 2 (2a, 2b, 2c, 2d, . . . ) are connected to each other through a signal line 7. Further, at least one (in the present embodiment, zone conveyor 2a) of the zone controllers 10 (10a, . . . 10n) is connected to a host controller 50 through a signal line 8.

Figure 4:
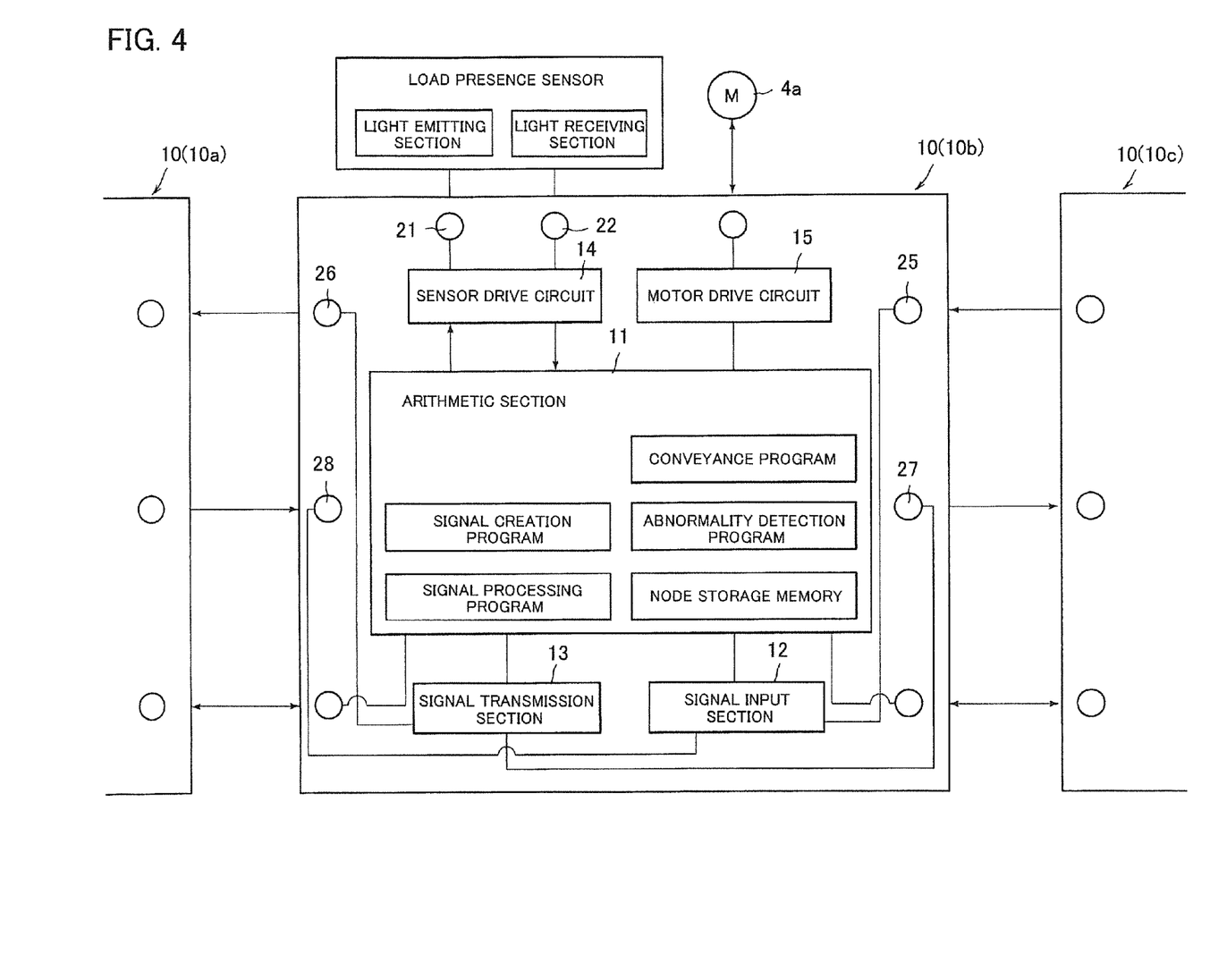
FIG. 4 is a view illustrating a wiring configuration of the zone controller adopted in the conveyor device of FIG. 1.

FIG. 4 illustrates in further detail an internal configuration and a connection state of each of the zone controllers 10a to 10n. Since the zone controllers 10a to 10n have the same configuration, a configuration of the zone controller 10b will be described as a representative example.

The zone controller 10b receives a signal from the load presence sensor Sb of the corresponding zone. That is, the zone controller 10b has a sensor signal input terminal 21.

Further, the zone controller 10b can transmit a light-emitting signal to the load presence sensor Sb and a pair of light emitting elements 20. That is, the zone controller 10b has a light-emitting element drive terminal 22.

Further, the zone controller 10b includes an arithmetic section 11, a signal input section 12, a signal transmission section 13, a sensor drive circuit 14, and a motor drive circuit 15. The signal input section 12 is connected to a right-side input terminal 25 and a left-side input terminal 28, individually processes a signal input from the right-side input terminal 25 and a signal input from the left-side input terminal 28, and outputs the processed signal to the arithmetic section 11.

In the present embodiment, the signal input section 12 has a signal reception function to receive, in addition to a signal normally used for conveyance, an abnormality alarm signal from adjacent zone controllers 10a and 10c.

The signal transmission section 13 is a circuit that transmits a signal output from the arithmetic section 11 to the outside, and is connected to a right-side output terminal 27 and a left-side output terminal 26.

In the present embodiment, the signal transmission section 13 has a processed signal transmission function to transmit, in addition to a signal normally used for conveyance, a signal processed by a signal processing function to the outside as an abnormality alarm signal.

The arithmetic section 11 incorporates therein a normal conveyance program for smoothly conveying a conveying object and a program specific to the present embodiment. The conveyance program includes an arithmetic circuit configured by a ZPA controller that performs zero-pressure accumulation control (ZPA control). The ZPA control is a control capable of avoiding collision between the conveying objects. The arithmetic section 11 refers to at least one of a signal input to the signal input section 12 and a signal output to the signal transmission section 13 to generate a control signal for driving the drive motor 4a and transmits the generated control signal to the motor drive circuit 15.

Further, the arithmetic section 11 performs an operation of receiving an external input signal such as a RUN/STOP signal from the host controller 50 and generating/transmitting a required control signal to the motor drive circuit 15.

Further, the arithmetic section 11 has a node number storage memory (storage unit) that stores a node number (to be described in detail later).

The program specific to the arithmetic section 11 will be described later.

The signal to be referred to by the arithmetic section 11 is selectively set by a not illustrated switch. That is, in the present embodiment, the conveyance program can be switched between a simultaneous conveyance mode, a separating conveyance mode, and a conveyance prohibiting mode, and the signal to be referred to by the arithmetic section 11 is selected according to the setting. Descriptions of the above conveyance modes are omitted.

The motor drive circuit 15 drives the drive motor 4a while receiving the control signal from the arithmetic section 11 and a detection signal from a hall element (magnetic pole position detector, not illustrated) provided in the drive motor 4a incorporated in the motor-incorporated roller 5a.

In this case, a desired signal can be transmitted and received between the zone controllers 10.

The zone controller 10 (zone controller 10b) of the present embodiment receives, through the signal input section 12, a load presence signal of the zone controller 10 (zone controller 10a) disposed adjacent thereto on an upstream side in the conveying direction of the conveying object, a load presence signal of the zone controller 10 (zone controller 10c) disposed adjacent thereto on a downstream side, and a drive state signal of the downstream side zone controller 10.

Further, the load presence signal and drive state signal output from the arithmetic section 11 of the zone controller 10b are transmitted to each of the other zone controllers 10a and 10c through the signal transmission section 13.

The load presence signal is a detection signal of the load presence sensors Sa to Sc (see FIGS. 1 and 3) provided in the respective control zones.

In the conveyor device 1 of the present embodiment, each of the zone controllers 10 can refer to the load presence signals of the respective upstream and downstream side zone controllers and the drive state signal of the downstream side zone controller.

A command signal from the host controller 50 is transmitted to a predetermined zone controller 10 (zone controller 10a) through the signal line 8, and then transmitted from the predetermined zone controller 10 (zone controller 10a) to all the zone controllers constituting the conveyor device 1 (see FIG. 3).

The zone controllers 10 exchange therebetween information on ON/OFF states of the load presence sensors S of adjacent zones and information on whether or not the drive motors 4a of the adjacent zones are activated.

The zone controller activates the drive motor 4a of its corresponding zone when a predetermined condition, for example, that a conveying object is present in the corresponding zone and a conveying object is not present in a zone on the downstream side is satisfied, to convey the conveying object to the zone on the downstream side.

The zone controller 10 of the present embodiment includes, in addition to the above program (conveyance program) for smoothly conveying a conveying object, a program (hereinafter, referred to as abnormality part detection program) for identifying a zone in which an abnormality has occurred.

Hereinafter, this abnormality part detection program will be described.

The abnormality part detection program includes an abnormality detection program (abnormality detection function), a signal creation program (signal creation function), and a signal processing program (signal processing function).

The abnormality detection program (abnormality detection function) is a program that detects an abnormality that has occurred in the zone managed by itself.

Detailed contents of the abnormality may be arbitrarily determined and include, for example, disconnection of the drive motor 4a, overcurrent of the drive motor 4a, temperature abnormality of the drive motor 4a, disconnection of the sensor, detection abnormality of the sensor, sensor noise, abnormality of the light-emitting element 20, detection abnormality of a signal input from the zone controller 10 of another zone, signal transmission defect, supply voltage drop, and the like.

Further, it is desirable that the zone controller 10b can detect an abnormality of the zone controller 10 itself.

The signal creation program (signal creation function) functions when an abnormality is detected by the abnormality detection program (abnormality detection function), and generates a pulse signal of a fixed time.

That is, the signal creation program (signal creation function) generates a pulse signal having a fixed time length (reference length) at a fixed period on the condition that an abnormality is detected by the abnormality detection program (abnormality detection function).

A length of the pulse signal (pulse width) is sufficiently shorter than the pulse period, and is set to, e.g., a length less than 1/20, more desirably, a length less than 1/50 of the pulse period.

Note that the pulse length is desirably equal to or more than 1/100 of the pulse period.

In the present embodiment, the pulse period is set to 6 seconds, and the length (reference length) of the pulse to be generated is set to 0.1 seconds. That is, the period of the pulse signal to be generated is 6 seconds. Of the 6 seconds, ON time is 0.1 seconds, and OFF time is 5.9 seconds.

The pulse signal created by the signal creation program (signal creation function) is distinguished from other signals and serves as an abnormality alarm signal. The abnormality alarm signal is passed through the signal transmission section 13 and is output from one of the output terminals. In the present embodiment, out of the right-side output terminal 27 and the left-side output terminal 26, the abnormality alarm signal is output from the left-side output terminal 26.

The signal processing program (signal processing function) functions when the abnormality alarm signal is input to the zone controller 10b from another zone controller 10, and extends the width of the pulse signal as the abnormality alarm signal by a fixed time.

In the present embodiment, the pulse width is extended up to a length obtained by adding the original pulse length (reference length). Specifically, the length of the input abnormality alarm signal is extended by 0.1 seconds. Thus, when the abnormality alarm signal having a length of 0.1 seconds is input, 0.1 seconds are added thereto to create a pulse having a length of 0.2 seconds, and the resultant signal is output from the left-side output terminal 26 as a new abnormality alarm signal. More specifically, when a pulse signal having a period of 6 seconds in which ON time is 0.1 seconds and OFF time is 5.9 seconds is input, the width of the input pulse signal is increased, and a pulse signal in which ON time is 0.2 seconds and OFF time is 5.8 seconds is output.

Similarly, if an abnormality alarm signal of 2.5 seconds is input, 0.1 seconds are added thereto to create a pulse having a length of 2.6 seconds, and the resultant signal is output from the left-side output terminal 26 as a new abnormality alarm signal.

Next, a function specific to the conveyor device 1 of the present invention will be described.

As described above, the conveyor device 1 of the present embodiment has a configuration in which the plurality of zone conveyors 2a, 2b, 2c, 2d, . . . are arranged in series in the conveying direction.

Figure 5:
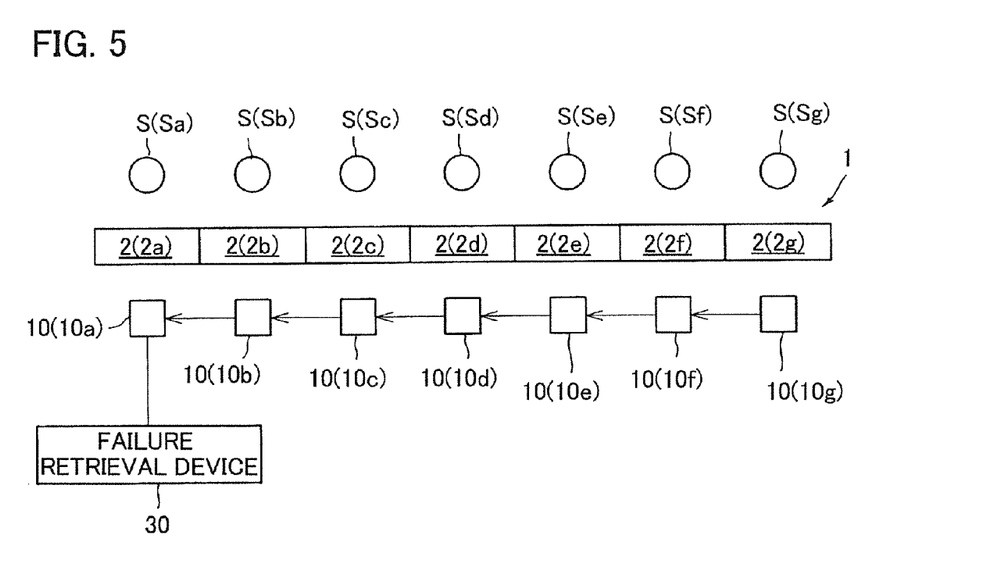
FIG. 5 is an explanatory view illustrating a state where a failure retrieval device is connected to the conveyor device of FIG. 1.

As illustrated in FIG. 5, it is assumed that seven zone conveyors 2a, 2b, 2c, 2d, 2e, 2f, and 2g are arranged in series in the conveying direction.

When the conveyor device 1 is subjected to a test run, or when any failure occurs, a failure retrieval device 30 is connected to any zone conveyor 2 (in the present embodiment, zone conveyor 2a).

In the present embodiment, the failure retrieval device 30 is connected to the zone controller 10a of the zone conveyor 2a positioned at the end of the conveyor device 1.

The failure retrieval device 30 is a device that receives the abnormality alarm signal output from the zone conveyor 2 and analyzes the received abnormality alarm signal. In the present embodiment, the abnormality alarm signal is output from the left-side output terminal 26, so that the failure retrieval device 30 is connected to the left-side output terminal 26 of the zone controller 10a.

The failure retrieval device 30 detects the pulse length (pulse width) of the abnormality alarm signal and performs an arithmetic operation of dividing the detected pulse length by the reference length.

Figure 6:
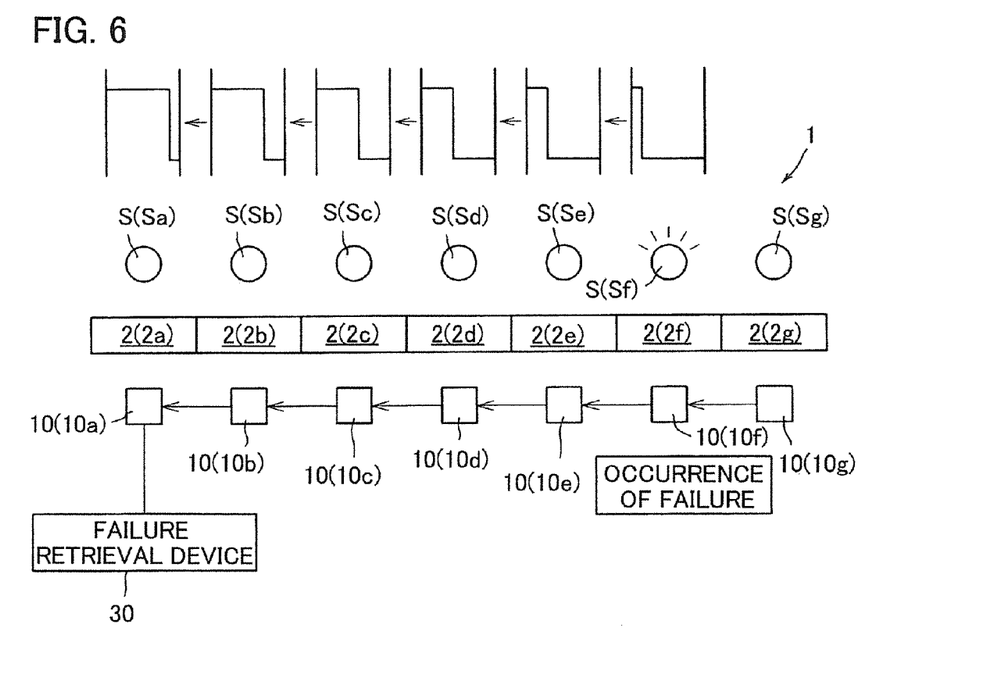
FIG. 6 is a view in which an abnormality alarm signal output from each zone controller is additionally illustrated in the explanatory view of FIG. 5.

Here, as illustrated in FIG. 6, it is assumed that an abnormality has occurred in the zone conveyor 2f.

In the conveyor device 1 of the present embodiment, when an abnormality occurs, the abnormality detection program (abnormality detection function) of the zone controller 10f that manages the zone in which the abnormality has occurred detects an occurrence of the abnormality.

Subsequently, a pulse signal having a period of 6 seconds and a reference pulse length of 0.1 seconds (a pulse signal having a period of 6 seconds in which ON time is 0.1 seconds and OFF time is 5.9 seconds) is generated by the function of the signal processing program (signal processing function), and the generated pulse signal is passed through the signal transmission section 13 and is output, as the abnormality alarm signal, from the left-side output terminal 26 (see FIG. 6).

The left-side output terminal 26 of the zone conveyor 2f is connected to the right-side input terminal 25 of the adjacent zone controller 10e, so that the abnormality alarm signal having a pulse length of 0.1 seconds created by the zone controller 10f as an abnormality generation source is input to the zone controller 10e adjacently disposed to the left side in the figure.

Then, as illustrated in FIG. 6, in the zone controller 10e, the signal processing program (signal processing function) creates a pulse signal having a pulse length of 0.2 seconds (a pulse signal having a period of 6 seconds in which ON time is 0.2 seconds and OFF time is 5.8 seconds) by adding the reference length to the input pulse signal. Then, the pulse signal having a pulse length of 0.2 seconds is output from the left-side output terminal 26 of the zone controller 10e as the abnormal alarm signal. The left-side output terminal 26 of the zone controller 10e is connected to the right-side input terminal 25 of the adjacent zone controller 10d, so that the abnormality alarm signal having a pulse length of 0.2 seconds created by the second zone controller 10f is input to the zone controller 10d adjacent to the left side in the figure, and the reference length is further added to create a pulse signal having a pulse length of 0.3 seconds (a pulse signal having a period of 6 seconds in which ON time is 0.3 seconds and OFF time is 5.7 seconds).

Similarly, the abnormality alarm signal having a pulse length of 0.3 seconds is input from the left-side output terminal 26 of the zone controller 10d to the adjacent zone controller 10c, and the reference length is further added to create a pulse signal having a pulse length of 0.4 seconds (having a period of 6 seconds in which ON time is 0.4 seconds and OFF time is 5.6 seconds).

Thus, as illustrated in FIG. 6, every time the pulse signal passes through the zone controller 10, the reference length is added to increase the pulse length and, finally, a pulse signal having a pulse length of 0.6 seconds (a pulse signal having a period of 6 seconds in which ON time is 0.6 seconds and OFF time is 5.4 seconds) is input from the zone controller 10a at the end portion to the failure retrieval device 30.

The failure retrieval device 30 detects the length of the input pulse of the abnormality alarm signal, and performs an arithmetic operation of dividing the detected pulse length by the reference length.

As a result, an arithmetic value is calculated. This arithmetic value coincides with the number of the zone controllers 10, including the zone controller 10f as the abnormality generation source, through which the pulse signal passes until it reaches the failure retrieval device 30. In other words, when the obtained arithmetic value is counted from the last zone controller 10a toward an upstream side in a transmission direction of the signal, the zone controller 10f as the abnormality generation source is reached.

Thus, the zone conveyor 2f as the abnormality generation source can be identified.

Figure 7:
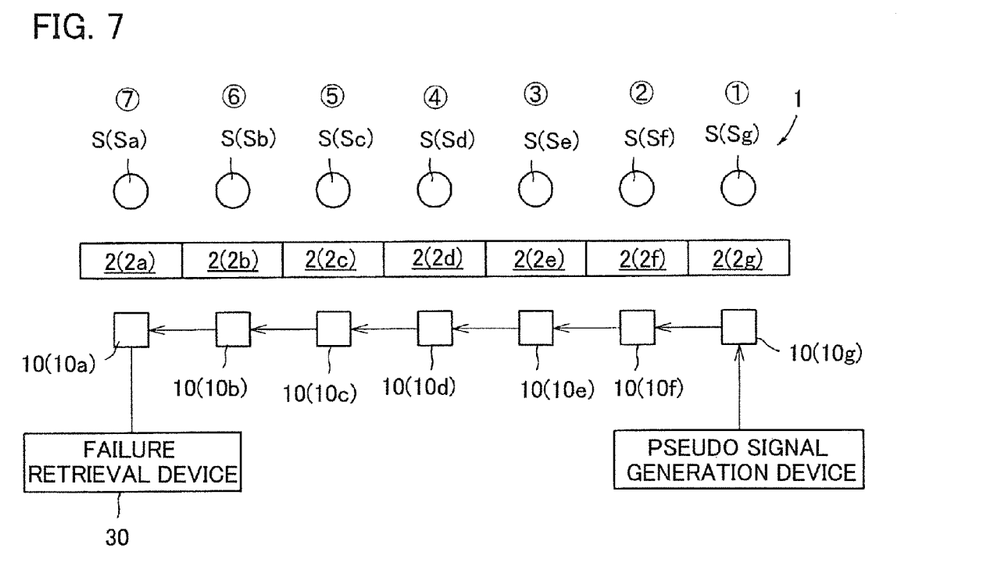
FIG. 7 is an explanatory view illustrating a state where a pseudo signal generation device is connected to the conveyor device of FIG. 1, in which a node number to be stored in each zone controller is additionally illustrated.

In the conveyor device 1 of the present embodiment, by inputting a pseudo abnormality alarm signal to a terminal end (most upstream side in the signal transmission direction) zone controller 10g, it is possible to allow each zone controller 10 to store its node number. This operation is specifically described below.

The above operation is performed in the test run of the conveyor device 1. A pulse signal (the same pulse signal as the above-described abnormality alai in signal) having a pulse length of 0.1 seconds is input to the right-side input terminal 25 of the terminal end zone controller 10g. Specifically, as illustrated in FIG. 7, a pseudo signal generation device is connected to the right-side input terminal 25 of the terminal end zone controller 10g. Then, a pulse signal having the reference pulse length is created in the pseudo signal generation device, and is input to the terminal end zone controller 10g as a pseudo abnormality alarm signal.

The terminal end zone controller 10g determines the node number thereof in accordance with the pulse length of the input pulse signal, and stores the determined node number in the node number storage memory of the arithmetic section 11 (see FIG. 4). Since the pulse length of the pulse signal input to the zone controller 10g is 0.1 seconds, "1" is stored as the node number.

As in the above operation of detecting the zone conveyor 2 as the abnormality generation source, in the zone controller 10g, the signal processing program (signal processing function) adds the reference length to the pulse length of the pulse signal. That is, in the zone controller 10g, a pulse signal having a pulse length of 0.2 seconds (a pulse signal having a period of 6 seconds in which ON time is 0.2 seconds and OFF time is 5.8 seconds) is created. Then, this pulse signal having a pulse length of 0.2 seconds is input to the zone controller 10f. That is, similarly to the abnormality alarm signal in the operation of detecting the zone conveyor 2, the generated pseudo abnormality alarm signal is input to the adjacent zone controller 10f.

Similarly, the zone controller 10f to which the pulse signal having a pulse length of 0.2 seconds is input determines the node number thereof in accordance with the pulse length of the input pulse signal, and stores the determined node number in the node number storage memory of the arithmetic section 11. Since the pulse length of the pulse signal input to the zone controller 10f is 0.2 seconds, "2" is stored as the node number.

That is, each zone controller 10 has a node number calculation function of calculating the node number from the pulse length of the input pulse signal. Then, the zone controller 10 performs operations of calculating the node number from the input pulse signal, storing the node number, processing the pulse signal, and outputting the processed pulse signal to the adjacent zone controller 10 (or failure retrieval device 30). Note that the processing of the pulse signal and the output of the processed pulse signal are performed in the same manner as those in the operation of detecting the zone conveyor 2 as the abnormality generation source.

Thus, along with the successive input of the pulse signal generated by the pseudo signal generation device, the node number is sequentially given to each zone controller 10 and the node number is stored in each zone controller 10.

When the conveyor device 1 is operated in a state where the node number is stored in each zone controller 10, signal exchange between the host controller 50 and each zone controller 10 is advantageously facilitated.

Specifically, as described above, the command signal from the host controller 50 is transmitted to a predetermined zone controller 10 (zone controller 10a) through the signal line 8, and is then transmitted from the predetermined zone controller 10 (zone controller 10a) to all the zone controllers constituting the conveyor device 1 (see FIG. 3).

Thus, when the host controller 50 outputs a signal indicating the node number (or relevant information for identifying the node number) and the command signal, the output signals are output from the predetermined zone controller 10 (zone controller 10a) to the adjacent zone controller 10 (zone controller 10b), and are thereafter successively output to the adjacent zone controllers 10. At this time, each zone controller 10 identifies whether or not the signal indicating the node number output together with the command signal indicates the node number of the zone controller 10 itself. When the node number coincides with the node number of the zone controller 10 itself, the zone controller 10 performs an operation instructed by the command signal, whereas when the node number does not coincide with the node number of the zone controller itself, the zone controller 10 does not perform an operation instructed by the transmitted command signal but outputs the input signal to the adjacent zone controller 10 as it is. That is, when the conveyor device 1 is operated in a state where the node number is stored in each zone controller 10, it is necessary for only the predetermined zone controller 10 to perform the operation instructed by the command signal output from the host controller 50, eliminating the need for all the zone controllers 10 to analyze the command signal. This facilitates signal exchange between the host controller 50 and the predetermined zone controller 10 of the plurality of zone controllers 10.

More specifically, when the node number is stored in each zone controller 10, simply outputting the command signal from the host controller 50 allows only a predetermined zone controller 10 to perform an operation of changing a motor speed provided in the zone managed by the predetermined zone controller 10 itself. Further, it is possible to allow only a predetermined zone controller 10 to change a conveying speed setting (slow start setting) in the zone conveyor 2 managed by the predetermined zone controller 10 itself. Furthermore, it is possible to allow only a predetermined zone controller 10 to perform program rewriting.

That is, when a change of control or program rewriting is performed for a specified zone controller 10, it is not always necessary to directly connect the zone controller 10 and host controller 50, but only by connecting the host controller 50 to a predetermined zone controller 10 belonging to the conveyor device 1, the control change or program rewriting for the specified zone controller 10 can be carried out. In other words, it is not necessary to perform a complicated connection work of directly connecting a predetermined zone controller 10 and the host controller 50 for the program rewriting and then connecting a different zone controller 10 and the host controller 50 for the program rewriting. This facilitates signal exchange between the host controller 50 and each zone controller 10.

Further, when the conveyor device 1 is operated in a state where the node number is stored in each zone controller 10, it is also possible to facilitate identification of the zone conveyor 2f as the abnormality generation source upon occurrence of any abnormality in the conveyor device 1.

Specifically, when an abnormality occurs, and the abnormality detection program of a zone controller 10 that manages the zone in which the abnormality occurs detects the occurrence of the abnormality, the zone controller 10 outputs a signal indicating the node number (or relevant information for identifying the node number) stored in the zone controller 10 itself and the abnormality alarm signal. At this time, another zone controller 10 outputs the input signals to the adjacent zone controller 10 (or failure retrieval device 30) as it is.

With this configuration, the signals transmitted from the zone controller 10 in which the abnormality occurs are output to the failure retrieval device 30 as it is after passing through another zone controller as needed. Since the signal indicating the node number (or relevant information for identifying the node number) is included in the transmitted signal, the failure retrieval device 30 can identify the zone controller 10 of the zone in which the abnormality has occurred. That is, with a configuration in which the conveyor device 1 is operated in a state where the node number is previously stored in each zone controller 10, it is possible to identify the zone controller 10 of the zone in which the abnormality has occurred without execution of processing for the abnormality alarm signal in each zone controller 10.

In the above embodiment, the pseudo signal generation device is connected to the zone controller 10, and the pseudo abnormality alarm signal is output from the pseudo signal generation device to the terminal end zone controller 10*g* to make each zone controller 10 store its node number. However, the present invention is not limited thereto. For example, a configuration may be adopted, in which any of the zone controller 10 outputs the pseudo abnormality alarm signal to make each zone controller store its node number.

Further, a timing at which each zone controller is made to store its node number is not limited to the test run time. For example, the operation of making each zone controller store its node number may be automatically performed when the conveyor device 1 is powered ON.

Figure 8:
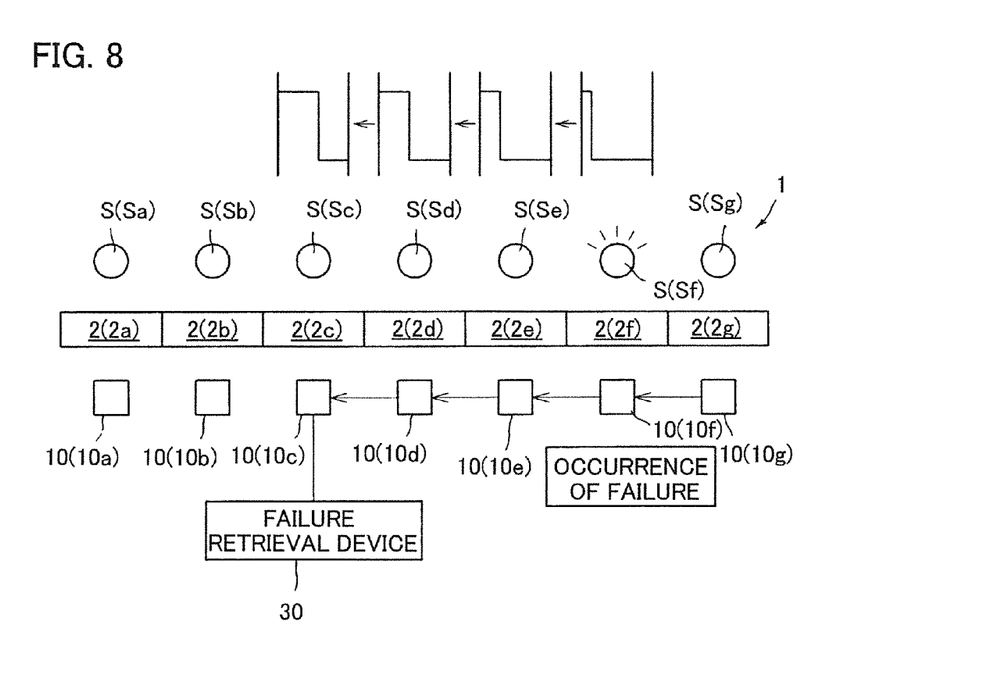
FIG. 8 is an explanatory view illustrating a state where a failure retrieval device is connected to a position different from that in the configuration of FIG. 6.

In the above embodiment, the failure retrieval device 30 is connected to the zone controller 10*a* at the end portion so as to retrieve the failure part. However, the present invention is not limited thereto. The failure retrieval device 30 may be connected to any position as long as it is located on the downstream side of the failure part in the signal transmission direction. For example, as illustrated in FIG. 8, when the failure retrieval device 30 is connected to the zone controller 10*c*, a pulse signal having a pulse length of 0.4 seconds is input to the failure retrieval device 30 and, thus, the failure retrieval device 30 can identify the failure part.

Figure 9:
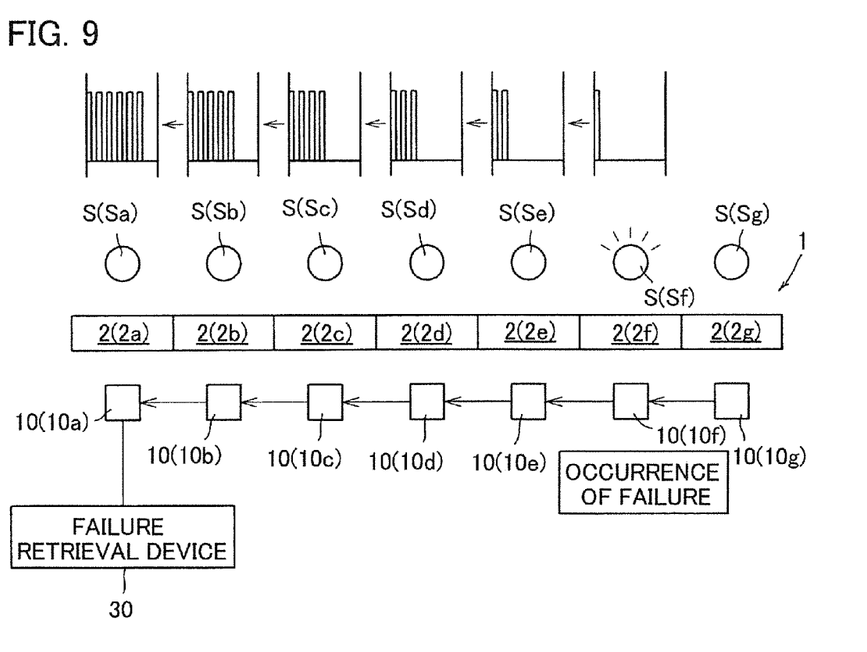
FIG. 9 is an explanatory view illustrating a state where the failure retrieval device is connected to a conveyor device of another embodiment of the present invention, in which the abnormality alarm signal output from each zone controller is additionally illustrated.

Further, in the above embodiment, every time the pulse signal passes through the zone controller 10, the pulse length is increased. Alternatively, however, as illustrated in FIG. 9, the number of pulses to be generated may be increased.

For example, the signal processing program (signal processing function) may be configured to add, when the abnormality alarm signal is input from another zone controller, a pulse having a predetermined length (e.g., reference length of 0.1 seconds) to the abnormality alarm signal. With this configuration, the number of pulses is increased by one every time the abnormality alarm signal passes through the zone controller. Thus, it is possible to identify a failure part simply by acquiring the number of pulses using the failure retrieval device 30.

Conversely, the pulse length or the number of pulses may be reduced every time the abnormality alai in signal passes through the zone controller.

In addition, it is possible to perform addition to (or subtraction from) a pulse signal that has been analyzed in a binary system (or a decimal system or hexadecimal system) and then transmit the resultant pulse signal.

In any case, the signal processing function may be a function that processes the pulse signal based on a function following a fixed rule.

Further, it is recommended to employ, in addition to the above-described configurations, a configuration in which a light-emitting element provided in the zone in which the abnormality has occurred is made to blink or in which only the light-emitting element in the zone is turned ON while the light-emitting elements of the other zones are turned OFF, so as to more easily find the zone in which the abnormality has occurred.

Further, in the above embodiment, one zone conveyor 2 is controlled by one zone controller 10. However, the conveyor device of the present invention is not limited thereto. For example, the conveyor device may be adopted in which a plurality of the zone conveyors may be controlled by one zone controller. Also in this case, by identifying the zone controller that manages the zone conveyor in the zone in which the failure has occurred, it is possible to identify the failure part in the conveyor device.

In the above embodiment, a roller conveyor is adopted as the zone conveyor 2. However, the conveyor device of the present invention is not limited thereto. For example, a belt conveyor may be adopted as the zone conveyor.

REFERENCE SIGNS LIST

1 conveyor device
2 zone conveyor
10 zone controller
12 signal input section (signal reception function)
13 signal transmission section (processed signal transmission function)

The invention claimed is:

1. A zone controller which is used for a conveyor device in which a plurality of zone conveyors are arranged in series, which manages one or a plurality of the zone conveyors to control an operation thereof, and which is configured to receive a signal from a different zone controller and transmit a signal to an outside, the zone controller comprising:
   a signal creation function that creates a predetermined abnormality alarm signal and transmits the created abnormality alarm signal to the outside when an abnormality occurs in a zone managed by the zone controller itself;
   a signal reception function that receives the abnormality alarm signal from the different zone controller;
   a signal processing function that applies certain processing to the received abnormality alarm signal to thereby change the received abnormality alarm signal; and
   a processed signal transmission function that transmits the changed signal processed by the signal processing function to the outside as the abnormality alarm signal.

2. The zone controller according to claim 1, wherein the abnormality alarm signal created by the signal creation function is a pulse signal having a fixed time length, and
   the signal processing function increases or reduces a pulse width of the pulse signal.

3. The zone controller according to claim 1, wherein the predetermined signal created by the signal creation function is a pulse signal having a fixed time length, and
   the signal processing function adds or subtracts a new pulse to or from the pulse signal to increase or reduce the number of pulses.

4. A zone controller which is used for a conveyor device in which a plurality of zone conveyors are arranged in series, which manages one or a plurality of the zone conveyors to control an operation thereof, and which is configured to receive a signal from a different zone controller and transmit a signal to an outside, the zone controller comprising:
   a signal reception function that receives a pulse signal from the different zone controller;
   a signal processing function that applies certain processing to the received pulse signal based on a certain function; and
   a processed signal transmission function that transmits the signal processed by the signal processing function to the outside.

5. The zone controller according to claim 4, further comprising a storage unit that stores the signal processed by the zone controller itself or information related to the processed signal.

6. The zone controller according to claim 5, further comprising a signal creation function that creates a predetermined abnormality alarm signal and transmits the created abnormality alarm signal to the outside when an abnormality occurs in a zone managed by the zone controller itself,
wherein the zone controller transmits the abnormality alarm signal and a signal based on the information stored in the storage unit.

7. The zone controller according to claim 5 further comprising a node number calculation function that determines a node number of the zone controller itself based on the received pulse signal,
wherein information related to the node number created by the node number calculation function is stored in the storage unit.

8. The zone controller according to claim 7, wherein the node number calculation function determines the node number based on a pulse width or the number of pulses of the received pulse signal.

9. The zone controller according to claim 5, further comprising a signal creation function that creates a predetermined abnormality alarm signal and transmits the created abnormality alarm signal to the outside when an abnormality occurs in a zone managed by the zone controller itself,
wherein the storage unit is configured to store information related to a node number of the zone controller,
the processed signal transmission function outputs both a signal indicating the information related to the node number and the abnormality alarm signal.

10. The zone controller according to claim 1, which is configured to output a pseudo abnormality alarm signal.

11. A conveyor device in which a plurality of zone conveyors are arranged in series, in which the zone controller according to claim 1 is provided for each zone or for each set of a plurality of zones, and in which a signal is exchanged between the adjacent zone controllers, wherein
when the zone controller receives the predetermined signal from a zone controller adjacently disposed on one side thereof by the signal reception function, the zone controller transmits the signal processed by the signal processing function, as an abnormality alarm signal, to a zone controller adjacently disposed on the other side thereof.

12. The conveyor device according to claim 11, wherein a pseudo abnormality alarm signal is created and transmitted to the zone controller,
the zone controllers that receive the pseudo abnormality signal perform, in a successive manner, a process of applying processing to the received signal by the signal processing function and transmitting the processed signal to zone controllers adjacently disposed on the other side thereof, and
each of the zone controllers is configured to store the signal processed by the zone controller itself or information related to the processed signal.

13. A conveyor device in which a plurality of zone conveyors are arranged in series, in which the zone controller according to claim 4 is provided for each zone or for each set of a plurality of zones, and in which a signal is exchanged between the adjacent zone controllers, wherein
each of the zone controllers includes a node number calculation function that determines a node number of the zone controller itself based on a pulse width or the number of pulses of the received pulse signal, and a storage unit configured to store the node number,
each of the zone controllers is configured to execute a node number determination operation of determining the node number based on the received signal, storing the determined node number, processing the signal received by the signal processing function, and transmitting the processed signal to the adjacent zone controller by the processed signal transmission function, and
successive execution of the node number determination operation in the zone controllers allows each of the zone controllers to store the node number therein.

14. The conveyor device according to claim 13,
wherein each of the zone controllers is configured to determine and store the node number based on a pseudo abnormality alarm signal or a signal obtained by processing the abnormality alarm signal, and
the node number determination operation is executed based on one of a pseudo abnormality alarm signal created by at least one zone controller, a pseudo abnormality alarm signal transmitted from an external device, and a signal obtained by processing the pseudo abnormality alarm signal.

15. The conveyor device according to claim 13,
wherein in a state where the node number is stored in each of the zone controllers,
each of the zone controllers is configured to execute an individual instruction operation of receiving a signal indicating information related to the node number and a command signal, performing an operation specified by the command signal when the received information related to the node number identifies the node number of the zone controller itself, and transmitting, to the adjacent zone controller, the received signal indicating the information related to the node number and command signal without processing the signals, and
successive execution of the individual instruction operation in the zone controllers allows only a predetermined zone controller to perform an operation specified by the command signal.

16. The conveyor device according to claim 11, wherein each of the zone controllers includes a signal creation function that creates a predetermined abnormality alarm signal and transmits the created abnormality alarm signal to the outside when an abnormality occurs in a zone managed by the zone controller itself, and a storage unit that stores the signal processed by the zone controller itself or information related to the processed signal,
the storage unit is configured to store information related to the node number,
the processed signal transmission function is configured to output both a signal indicating the information related to the node number and the abnormality alarm signal, and
each of the zone controllers outputs, when an abnormality occurs in a zone managed by the zone controller itself, two signals which are the signal indicating the information related to the node number and the abnormality alarm signal to the adjacent zone controller, and the zone controller that receives the two signals from a zone controller adjacently disposed on one side thereof outputs, to a zone controller adjacently disposed on the other side thereof, the two signals without processing the signals.

17. The conveyor device according to claim 11, wherein when the zone controllers execute, in a successive manner, the process of applying processing to the received signal and transmitting the processed signal to the adjacent zone controllers, the signal before the processing and the signal after the processing which are exchanged between the zone controllers have a fixed period but are different in pulse width or the number of pulses.

18. The zone controller according to claim 4, which is configured to output a pseudo abnormality alarm signal.

19. The conveyor device according to claim 13, wherein each of the zone controllers includes a signal creation function that creates a predetermined abnormality alarm signal and transmits the created abnormality alarm signal to the outside when an abnormality occurs in a zone managed by the zone controller itself, and a storage unit that stores the signal processed by the zone controller itself or information related to the processed signal, the storage unit is configured to store information related to the node number, the processed signal transmission function is configured to output both a signal indicating the information related to the node number and the abnormality alarm signal, and each of the zone controllers outputs, when an abnormality occurs in a zone managed by the zone controller itself, two signals which are the signal indicating the information related to the node number and the abnormality alarm signal to the adjacent zone controller, and the zone controller that receives the two signals from a zone controller adjacently disposed on one side thereof outputs, to a zone controller adjacently disposed on the other side thereof, the two signals without processing the signals.

20. The conveyor device according to claim 13, wherein when the zone controllers execute, in a successive manner, the process of applying processing to the received signal and transmitting the processed signal to the adjacent zone controllers, the signal before the processing and the signal after the processing which are exchanged between the zone controllers have a fixed period but are different in pulse width or the number of pulses.

* * * * *